(12) United States Patent
Tsuchitoi

(10) Patent No.: US 7,471,406 B2
(45) Date of Patent: Dec. 30, 2008

(54) PRINTING CONTROL APPARATUS AND METHOD, AND PRINTING SYSTEM

(75) Inventor: Naoki Tsuchitoi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1006 days.

(21) Appl. No.: 10/397,819

(22) Filed: Mar. 26, 2003

(65) Prior Publication Data

US 2003/0184807 A1     Oct. 2, 2003

(30) Foreign Application Priority Data

Mar. 29, 2002  (JP)  ............................. 2002-096175
Mar. 11, 2003  (JP)  ............................. 2003-064780

(51) Int. Cl.
*G06F 3/12*   (2006.01)
*G06K 15/00*  (2006.01)

(52) U.S. Cl. ..................... 358/1.15; 358/1.13; 358/1.17

(58) Field of Classification Search ................ 358/1.13, 358/1.15, 1.14, 1.16, 1.17, 1.18, 1.1, 1.2, 358/1.3, 1.4, 1.5, 1.6, 1.7, 1.8, 1.9, 1.11, 358/1.12, 404, 407, 444, 468; 347/2, 3, 5, 347/14, 23; 399/1, 8; 710/52, 53, 310
See application file for complete search history.

(56) References Cited

U.S. PATENT DOCUMENTS

| | | | | |
|---|---|---|---|---|
| 5,222,200 | A | * | 6/1993 | Callister et al. ............. 358/1.13 |
| 5,555,435 | A | * | 9/1996 | Campbell et al. ........... 358/1.13 |
| 5,852,709 | A | * | 12/1998 | Watanabe ................... 358/1.13 |
| 6,633,395 | B1 | | 10/2003 | Tuchitoi et al. ............ 358/1.14 |
| 6,963,416 | B2 | | 11/2005 | Tuchitoi et al. ............ 358/1.14 |
| 7,145,683 | B2 | | 12/2006 | Tuchitoi et al. ............ 358/1.15 |

FOREIGN PATENT DOCUMENTS

| | | |
|---|---|---|
| EP | 0923024 A2 | 6/1999 |
| JP | 2000-135820 | 5/2000 |

OTHER PUBLICATIONS

English Abstract of JP 2000-135820.

* cited by examiner

*Primary Examiner*—Dov Popovici
(74) *Attorney, Agent, or Firm*—Morgan & Finnegan, LLP

(57) ABSTRACT

The present invention ascertains delimiting boundaries of print jobs quickly and accurately in a printing apparatus. The printing apparatus determines the type of PDL that describes print data received from a host computer. If a session is completed, data cannot be received within a fixed period of time, or if end of PDL defined by an end-of-job command is found, then the printing apparatus delimits a print job using the position at which the above event occurs. If none of the above apply, the printing apparatus stores the acquired print data in a receive buffer. If the data immediately follows end of PDL, then the printing apparatus regards this data as the beginning of another print job, newly assigns a job identifier to this print job and stores the same in the receive buffer. The stored print data is managed in correlation with the job identifier thereof.

7 Claims, 15 Drawing Sheets

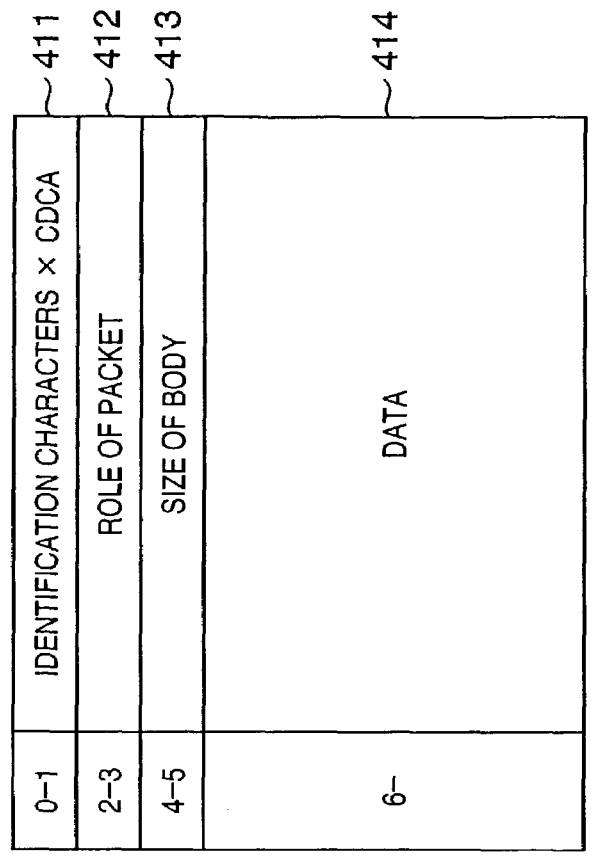
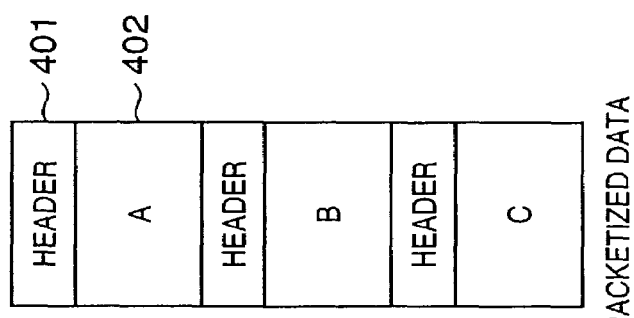
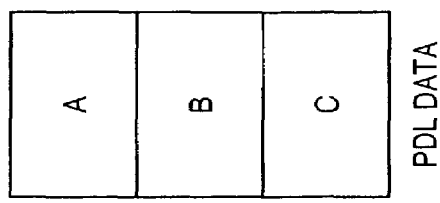

FIG. 5

```
<ESC>%-12345X

@PJL ENTER LANGUAGE=LIPS

ACTUAL DATA

<ESC>%-12345X
```

FIG. 7A

| "EOJ" | END COMMAND |

FIG. 7B

| CHARACTER PRINT INSTRUCTION | PARAMETER LENGTH | "....EOJ...." |

FIG. 8A | COMMAND CHARACTER STRING

FIG. 8B | COMMAND CHARACTER STRING | FIXED-LENGTH PARAMETER

FIG. 8C | COMMAND CHARACTER STRING | PARAMETER LENGTH | VARIABLE-LENGTH PARAMETER

PRINTING CONTROL APPARATUS AND METHOD, AND PRINTING SYSTEM

FIELD OF THE INVENTION

This invention relates to a printing system in which print data is generated by, e.g., a host printer, transmitted to a printing apparatus and printed by the printing apparatus. The invention further relates to a printing control apparatus and method in this system.

BACKGROUND OF THE INVENTION

Many printing systems of this kind have been proposed. They not only print data but also check the state of each of a series of print jobs involving print data and, in response to a user request, make it possible to perform such print-job operations as print cancel, print stop and resume, and print interrupt. (These operations shall be referred to collectively as "job manipulation" below.) As a result, these systems provide a sophisticated operating environment and contribute to greater user convenience.

In ISO-10175 (Document Print Application), these operations are proposed as abstract concepts.

The print cancel operation is an operation for allowing the user to cancel only a job specified by an identifier, with the printing of other jobs being allowed to continue. The stop and resume operation is for halting the print processing of a job specified by an identifier in response to a stop operation by the user, allowing another job to be printed ahead of the stopped job, and instructing resumption of the stopped job in response to a resume operation performed by the user. The interrupt operation is for allowing a job specified by an identifier to be printed with the highest priority and achieves this by stopping the preceding job and then allowing the preceding job to resume after the specified job is printed.

A necessary prerequisite to these operations is that a job-specific identifier be issued with respect to a job upon clearly recognizing the beginning and end of the job in advance. The reason for this is that all of the operations are carried out upon specifying the identifier.

When to assign an identifier is important. For example, assume that an identifier is assigned by a PDL (Page Description Language) interpreter while print processing in a printing apparatus is in progress. Since the storing of a print job in receive and transmit buffers takes place ahead of the operation of the PDL interpreter, in this case the print job that is stored in the receive buffer will not yet have an identifier assigned to it. As a consequence, a print job that is to undergo job manipulation is limited to a print job having an identifier assigned to it by the PDL interpreter, and the timing of the job manipulation also is limited.

A job identifier can also be assigned to a print job by a host computer. However, a job identifier that has been assigned by a host computer is not a unique identifier as far as the printing apparatus is concerned; even if an identifier is actually applied, the printing apparatus cannot perform a job manipulation regarding the print job to which this identifier has been assigned. Accordingly, an identifier generated by the printing apparatus is used as the identifier for identifying the print job that is to undergo job manipulation. The problem that arises here is when and how the printing apparatus should assign the identifier.

In order to clarify the decision regarding the boundary between print jobs, it is necessary to analyze (parse) the data itself and positively recognize the starting point and end point of each job. The simplest approach is to assign an identifier when the job undergoes PDL interpretation. This method is reliable in that the beginning and end of a job is recognized. In general, however, PDL interpretation subjects the printing apparatus to the heaviest load in that it involves the generation of rendering data, etc. When the processing for assigning the identifier is placed ahead of processing for storing the print job in a receive buffer in the printing apparatus, therefore, the efficiency with which data is received declines locally and there is the possibility that the performance of print processing itself will diminish to a great extent. Ordinarily, it is required that a receive buffer having a comparatively large capacity be placed ahead of the PDL interpreter. This is done in order to avoid a decline in receiving efficiency.

FIG. 1 is a conceptual view useful in describing the operation of a controller in a PDL-type printing apparatus according to the prior art. The apparatus shown in FIG. 1 includes a data receiver 101 for receiving data from a host via a prescribed communication medium; a receive buffer 102 for temporarily storing data sent from the data receiver 101; a rendering generating unit 103 for extracting PDL data from the receive buffer 102, applying translation processing and effecting a conversion to printable intermediate data; an intermediate-data buffer 104 for storing the intermediate data generated by the draw generating unit 103; and a rendering unit 105 for rendering the intermediate data in real time and transmitting the results to a prescribed printer engine. The controller is composed of the above components. The receive buffer 102 may be one constituted by a RAM and having a comparatively small buffer capacity, or one having a large buffer capacity and employing a secondary storage device such as a hard disk. If it is assumed that an identifier is assigned to a job at the time of PDL interpretation, as described above, identifiers will have been assigned to print jobs that fall within the limits indicated in FIG. 1 as being an area in which a job manipulation is possible. It is possible to subject these print jobs to manipulation. However, since an identifier will not yet have been assigned with regard to a print job received in the receive buffer 102 placed in front of the above job manipulation area, job manipulation cannot be applied to this print job. If the arrangement is such that the receive buffer 102 is constituted by a hard disk, a large number of print jobs will accumulate in the receive buffer 102 and, as a result, the user will be unable to subject most of these print jobs to job manipulation because these jobs will not have assigned identifiers.

In an effort to solve this problem, a packet-based printing method using job packets is proposed in the specification of Japanese Patent Application Laid-Open No. 2000-135820. In accordance with this method, a print job is described in ordinary PDL, the job is transmitted upon being divided up into job packets, and the job packets are processed by a pre-processor placed ahead of the receive buffer, whereby the starting and end points of the job are ascertained before input to the receive buffer. The job packet is composed of a header and body. The role of the packet and the packet size are described in the header, and code corresponding to the beginning and end of the job is described in the role of the packet.

The pre-processor that interprets the job packet interprets the header of the job packet, detects the role of the job packet and delivers the actual data to the succeeding stage. Most of the received data, therefore, need not be interpreted. Thus, through processing that is very light in comparison with PDL parsing, packets are judged, print jobs are delimited and a job identifier (also referred to as an "object ID") can be attached to each print job. As a result, a print job can be distinguished at an early stage and, moreover, there is no decline in performance. In addition, a print job can be specified in the printing apparatus using the attached object ID and this job can be manipulated.

FIG. 2 is a conceptual view useful in describing the operation of a controller in a job-packet-type printing apparatus according to the prior art. This controller has a pre-processor 106 in addition to the components shown in FIG. 1. If the pre-processor 106 receives a packetized print job and the role of a packet is start of the print job, the pre-processor 106 assigns a unique job identifier and then delivers the packet to succeeding stage.

Thus, in accordance with the print-data transfer method that relies upon packetization, it is possible to execute sophisticated print job manipulations by distinguishing among print jobs before they are stored in the receive buffer. In addition, there is no decline in the print-job receiving performance. Both of these points, therefore, can be reconciled.

However, it is required that a printing apparatus support also the conventional PDL transfer method that does not rely upon packetization. This is for the purpose of maintaining compatibility with already existing devices that do not support packetization. Another reason is to have an emulation capability. In such case, however, the boundaries of print jobs cannot be recognized until PDL interpretation is executed, as described above, and hence a limitation is imposed upon the level of print job manipulations that can be implemented.

SUMMARY OF THE INVENTION

Accordingly, an object of the present invention is to provide a printing control apparatus, printing control method and printing system whereby print jobs described in page description language can be delimited accurately job by job and each print job can be managed job by job.

Another object of the present invention is to so arrange it that a job identifier can be issued for a packetized print job at an earlier stage, and to so arrange in that a job identifier can be issued as early as possible even for a print job that has not been packetized.

According to the present invention, the foregoing object is attained by providing a printing control apparatus comprising: receiving means for receiving print data; a receive buffer for storing received print data; and print-job detecting means placed ahead of the receive buffer for storing print data received by the receiving means in the receive buffer while discriminating an end point of the print data, and if an end point is discriminated, adopting this end point as a boundary between print jobs and recording unique identifiers correlated with respective ones of the print jobs.

By virtue of this arrangement, print data that has been received can be delimited job by job and the print data can be managed job by job.

Alternatively, in accordance with another aspect of the present invention, if received print data has been described in page description language, the print-job detecting means searches for an end instruction, which is contained in the print data, while jumping over arguments and decides that the position of the end instruction is the end point of a print job.

Alternatively, in accordance with another aspect of the present invention, if received print data has been described in page description language, the print-job detecting means searches for an explicit end instruction, which is contained in the print data, and decides that the position of the explicit end instruction is the end point of a print job.

Alternatively, in accordance with another aspect of the present invention, if received print data has been described in page description language, the print-job detecting means searches for an end instruction, which is contained in the print data, while jumping over arguments in case where the page description language does not contain an explicit end instruction, searches for an explicit end instruction contained in the print data in a case where the page description language contains an explicit end instruction, and decides that the position of a found end instruction is the end point of a print job.

Alternatively, in accordance with another aspect of the present invention, the receiving means receives print data through a communication procedure in which print jobs and sessions are linked, and the print-job detecting means decides that the boundary of a session in the communication procedure is an end point of a print job and, if an end point cannot be decided, searches for an end instruction contained in the print data.

Alternatively, in accordance with another aspect of the present invention, if an interval at which print data is received by the receiving means exceeds a fixed period of time, the print-job detecting means adopts the position at which this occurs as the boundary of a print job; and if an interval at which print data is received by the receiving means does not exceed the fixed period of time, the print-job detecting means searches for an end instruction contained in the print data.

Alternatively, in accordance with another aspect of the present invention, an instruction to transmit the identifier of a print job is answered with the identifier in regard to a print job that corresponds to print data that has been stored in the receive buffer.

Alternatively, in accordance with another aspect of the present invention, if an operation instruction regarding a print job is received together with an identifier of the print job, an operation specified by the operation instruction is applied to a print job that corresponds to this identifier.

Alternatively, in accordance with another aspect of the present invention, there is provided a printing system having a host computer for generating print data; a printing apparatus for receiving print data, which has been transmitted from the host computer, and interpreting a portion described in page description language contained in the print data, thereby generating print data and printing the same; and prescribed communication means for connecting the host computer and the printing apparatus; the system including end sensing means placed ahead of the receive buffer within the printing apparatus for searching received print data for a portion described in page description language and finding an end point, thereby clarifying a starting point and an end point of the print data and recognizing these as being indicative of one print job, and assigning a uniquely decided identifier to the print job that has been recognized.

A print job that has been input to the printing apparatus can be subjected to job cancel, interrupt and stop/resume operations immediately.

Alternatively, in accordance with another aspect of the present invention, the end sensing means determines a portion described in page description language in print data, applies syntactical interpretation to the portion determined, and adopts an end instruction, which has been found syntactically, as an end point of print data.

Alternatively, in accordance with another aspect of the present invention, the end sensing means determines a portion described in page description language in print data, forward searches the determined portion for a code character string that will serve as an end point, and adopts a point as an end point of the print data based upon retrieval of the code character string.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 4A is a schematic view illustrating an example of PDL data that has not been packetized; FIG. 4B is a schematic view in which the PDL data of FIG. 4A has been packetized; FIG. 4C is a schematic view useful in describing the details of the structure of a single packet;

FIG. 5 is a diagram illustrating an example of representation of job control language;

FIG. 7A is a diagram illustrating an example of an end command indicating end of PDL; FIG. 7B is a diagram illustrating an example of representation of a character-string print instruction;

FIGS. 8A to 8C are diagrams illustrating an ordinary command system in PDL;

DESCRIPTION OF THE PREFERRED EMBODIMENTS

Preferred embodiments of the present invention will now be described with reference to the drawings.

First Embodiment

<Configuration of Printing System (FIG. 3)>

Figure 1:
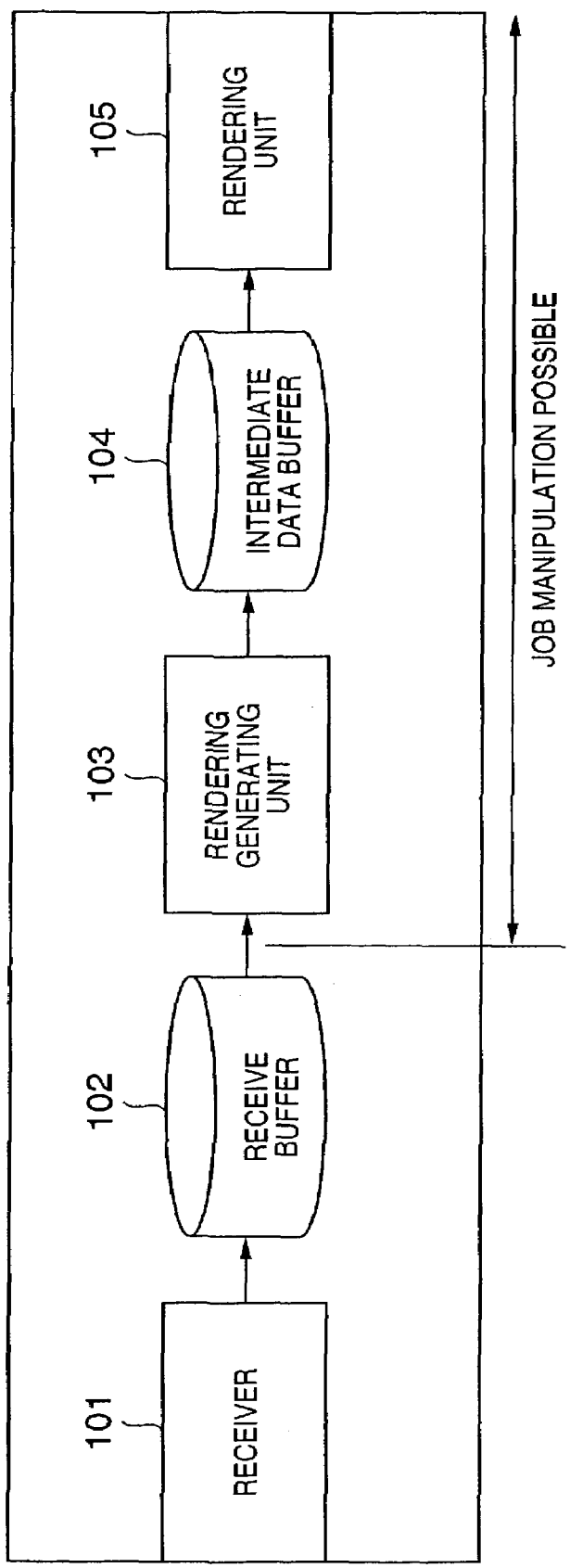
FIG. 1 is a conceptual view useful in describing the operation of a controller in a PDL-type printing apparatus according to the prior art.
Figure 2:
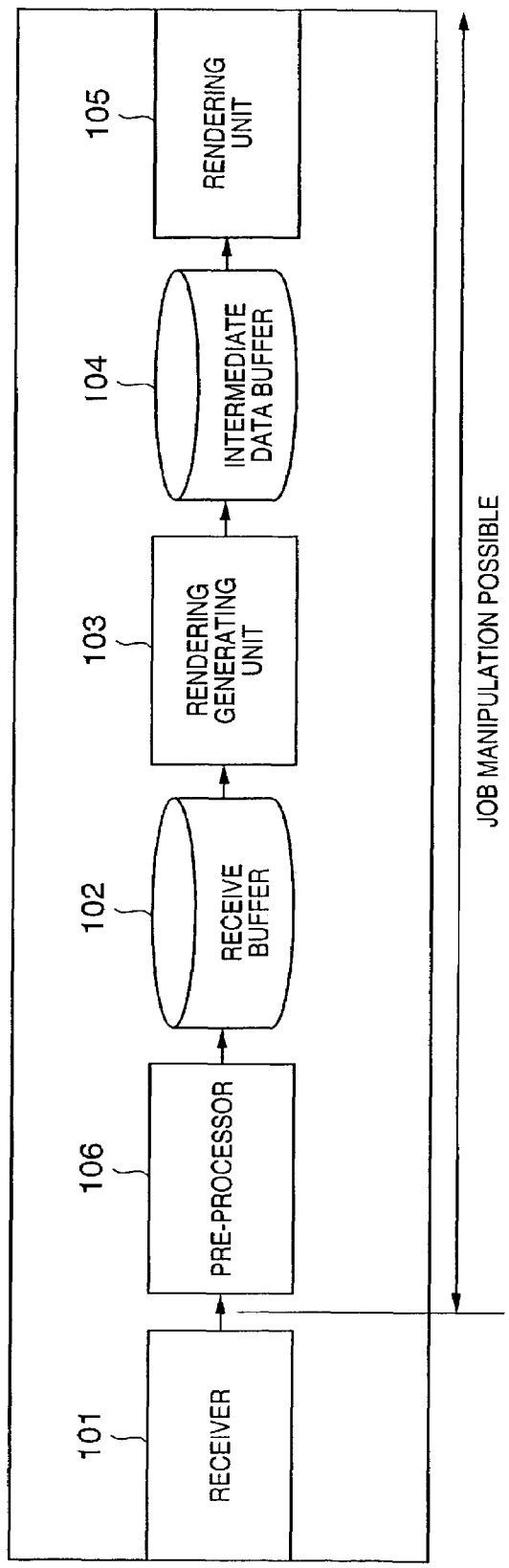
FIG. 2 is a conceptual view useful in describing the operation of a controller in a job-packet-type printing apparatus according to the prior art.
Figure 3:
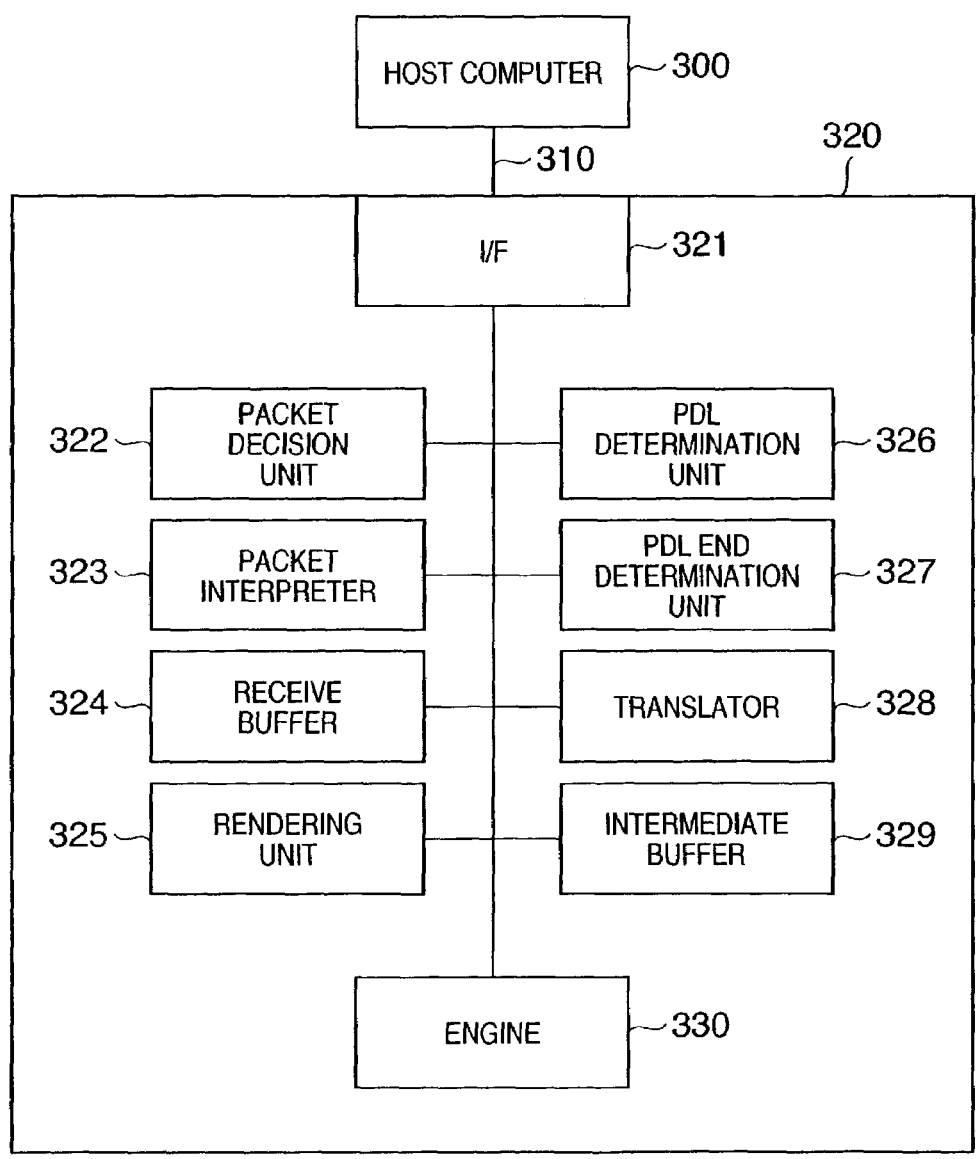
FIG. 3 is a schematic view illustrating the configuration of a printing system according to a first embodiment of the present invention.

FIG. 3 is a schematic view illustrating the configuration of a printing system according to a first embodiment of the present invention.

As shown in FIG. 3, the printing system comprises a host computer 300, a prescribed communication medium 310 and a printing apparatus 320. The communication medium 310 may be a local interface such as an IEEE 1284 interface or a USB, or a network interface such as Ethernet.

The printing apparatus 320 includes an interface 321 that actually communicates with the communication medium 310 to receive print data; a packet decision unit 322 for examining received print data and deciding whether the received data is packetized data or data that has been sent in PDL; a packet interpreter 323 for interpreting a packet of packetized data and sending the PDL segment thereof to a receive buffer 324; the receive buffer 324 for storing PDL data temporarily; a PDL determination unit 326 for determining the PDL name; a PDL end determination unit 327 for sensing the end point of PDL data; a translator 328 for interpreting PDL and generating rendering data; an intermediate buffer 329 for storing the rendering data temporarily; a rendering unit 325 for extracting rendering data from the intermediate buffer 329, rendering the data and transferring the results to an engine 330; and the engine 330 for printing the rendered results on physical paper by known printing means. The engine 330 may be an electrophotographic engine or an ink-jet engine.

The host computer 300 allows the user to generate print data from a desired image, which has been produced via a graphical user interface (GUI), by means of software referred to as a driver for generating specific print data. The host computer 300 transmits this print data to the printing apparatus 320. There is a case where data obtained by packetizing PDL is generated as the print data, and a case where PDL data that has not been packetized is generated as the print data.

The print data is transmitted to the printing apparatus 320 via the communication medium 310. When the print data is received by the interface 321, the data is delivered to the packet decision unit 322, which decides whether the print data is in the packet format or not.

Figure 11:
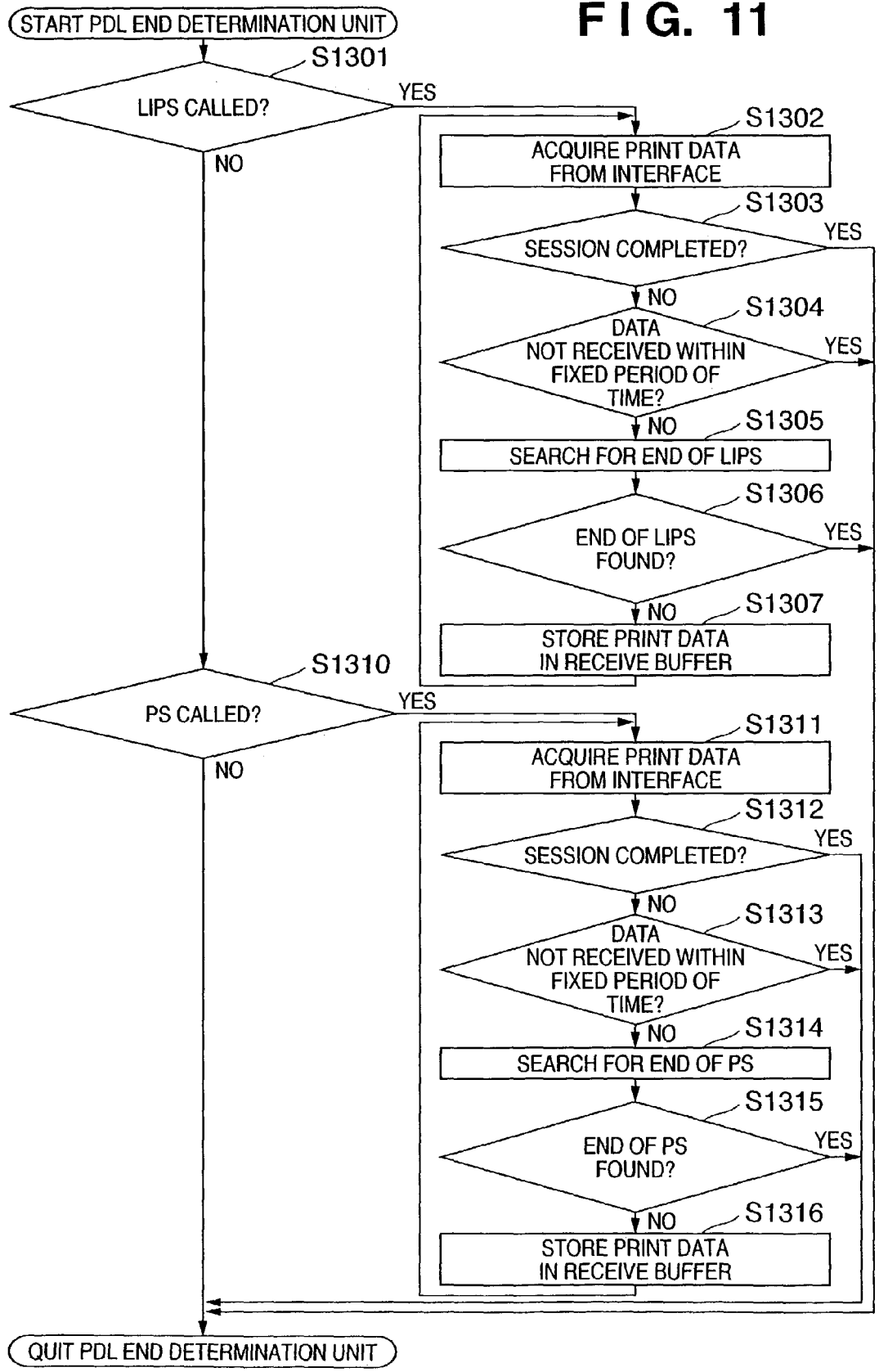
FIG. 11 is a flowchart useful in describing operation of an improved PDL end determination unit in a third embodiment of the present invention.
Figure 12:
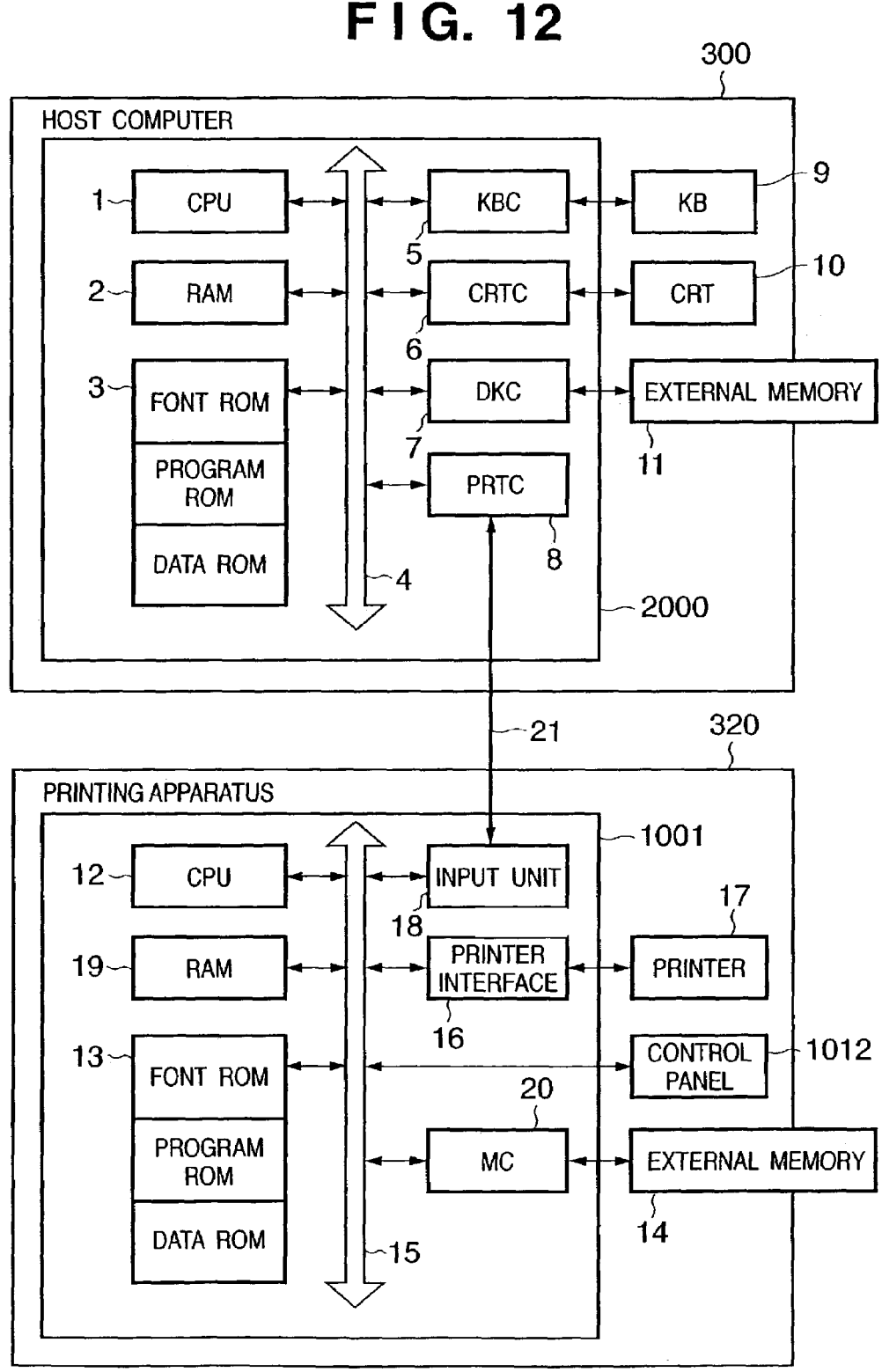
FIG. 12 is a block diagram illustrating the hardware implementation of a printing system.

FIG. 12 is a block diagram illustrating the hardware implementation of the printing system shown in FIG. 3. In the arrangement of FIG. 12, the functions of the components constituting the printing apparatus 320 of FIG. 3, as well as procedures shown in FIGS. 6 and 11 described later, are implemented by executing a program using a CPU 12 in the printing apparatus 320.

As shown in FIG. 12, the host computer 300 has a CPU 1 which, on the basis of a word processing program that has been stored in a program ROM of a ROM 3, executes the word processing of a document containing mixed objects such as graphics, images, text and tables (inclusive of spreadsheets, etc.). The CPU 1 performs overall control of various devices connected to a system bus 4. A RAM 2 functions as the main memory and work area of the CPU 1. A keyboard controller (KBC) 5 controls key inputs from a keyboard 9 and a pointing device, which is not shown. A CRT controller (CRTC) 6 controls the display on a CRT display 10. A disk controller (DKC) 7 controls access to an external memory 11, such as a hard disk or floppy disk, which stores a booting program, various applications, font data, user files and edited files. A printer controller (PRTC) 8, which is connected to the printing apparatus 320 via a prescribed bidirectional interface 21, executes processing for controlling communication with the printing apparatus 320.

The printing apparatus 320 has a printer CPU 12. On the basis of a control program, etc., stored in a program ROM of a ROM 13, the printer CPU 12 controls overall access to various devices connected to a system bus 15 and outputs an image signal, which serves as output information, to a printing unit (printer engine) 17 connected via a printing-unit interface 16. The CPU 12, which is capable of communication with the host computer 300 via the bidirectional interface 21, is so as adapted as to be capable of reporting information within the printing apparatus 320 to the host computer 300. A RAM 19 functions as the main memory and work area, etc., of the CPU 12. An input unit 18 controls communication of status information, such as print status information, with the host computer 300 via the bidirectional interface 21, and is capable of reporting internal status to the host computer 300. A memory controller (MC) 20 controls access to an external memory 14, such as a hard disk or floppy disk, which stores a booting program, various applications, font data, user files and edited files. A control panel 1012, which includes a display panel and keyboard, provides the operator with information and allows the operator to enter commands.

<Structure of PDL Data (FIGS. 4A and 4B)>

PDL data that has not been packetized and PDL data that has been packetized will now be described.

FIG. 4A is a schematic view illustrating an example of PDL data that has not been packetized. For the sake of convenience, it is assumed that the PDL data has been divided into three parts denoted A, B and C. FIG. 4B illustrates the PDL data of FIG. 4A in packetized form. In the packetized PDL data, each of the parts A, B, C is provided with additional information referred to as a header, indicated at 401. A combination of the header 401 and actual data 402 is referred to as a packet.

FIG. 4C is a schematic view useful in describing the details of the structure of a single packet.

As shown in FIG. 4C, the packet, which has been simplified in order to simplify the description, contains six bytes of information as the header. Bytes 0 to 1 include identification characters (the value of which is 0xCDCA in this embodiment) 411 for identifying the data as a packet. An operation code 412 indicating the role of the packet is entered as bytes 2 and 3. For example, the role of the packet can be discriminated by entering a code such as 0x0001 in a case where the beginning of a job is to be indicated and a code such as 0x0002 in a case where the end of a job is to be indicated. Bytes 4 and 5 describe the size (body size) 413 of a data section 414 that follows. The packet interpreter 323, the details of which will be described later, inputs data of the size indicated to the receive buffer and, in addition, is capable of determining the starting and end points of print data, without performing a syntactical interpretation of the data, based upon the above-mentioned code indicating the role of the packet. It should be noted that since the size of the data section 414 is described by the two bytes, the amount of data is expressed by 0 to 65535 bytes. If the amount of print data is greater than this, it is necessary to divide the print data into packets as shown at A, B and C in FIG. 4B.

When print data is sent from the interface 321, the packet decision unit 322 checks to determine whether the two bytes at the beginning of the packet match the identification characters 411 in FIG. 4C. If there is a match, the packet decision unit 322 regards the data as packetized PDL data and transfers the print data to the packet interpreter 323. If there is no match, then the packet decision unit 322 transfers the print data to the PDL determination unit 326. In order to render the above decision accurately, it is necessary to select a character string (code string), which is not included in PDL data, as the identification characters (0xCDCA in this embodiment) used in the decision. The packet interpreter 323 interprets the packetized data and, if the code indicating packet role is indicative of job start, acquires the job identifier and transfers this identifier to the receive buffer 324 as a key. The header is removed from the packet at this time.

Figure 13:
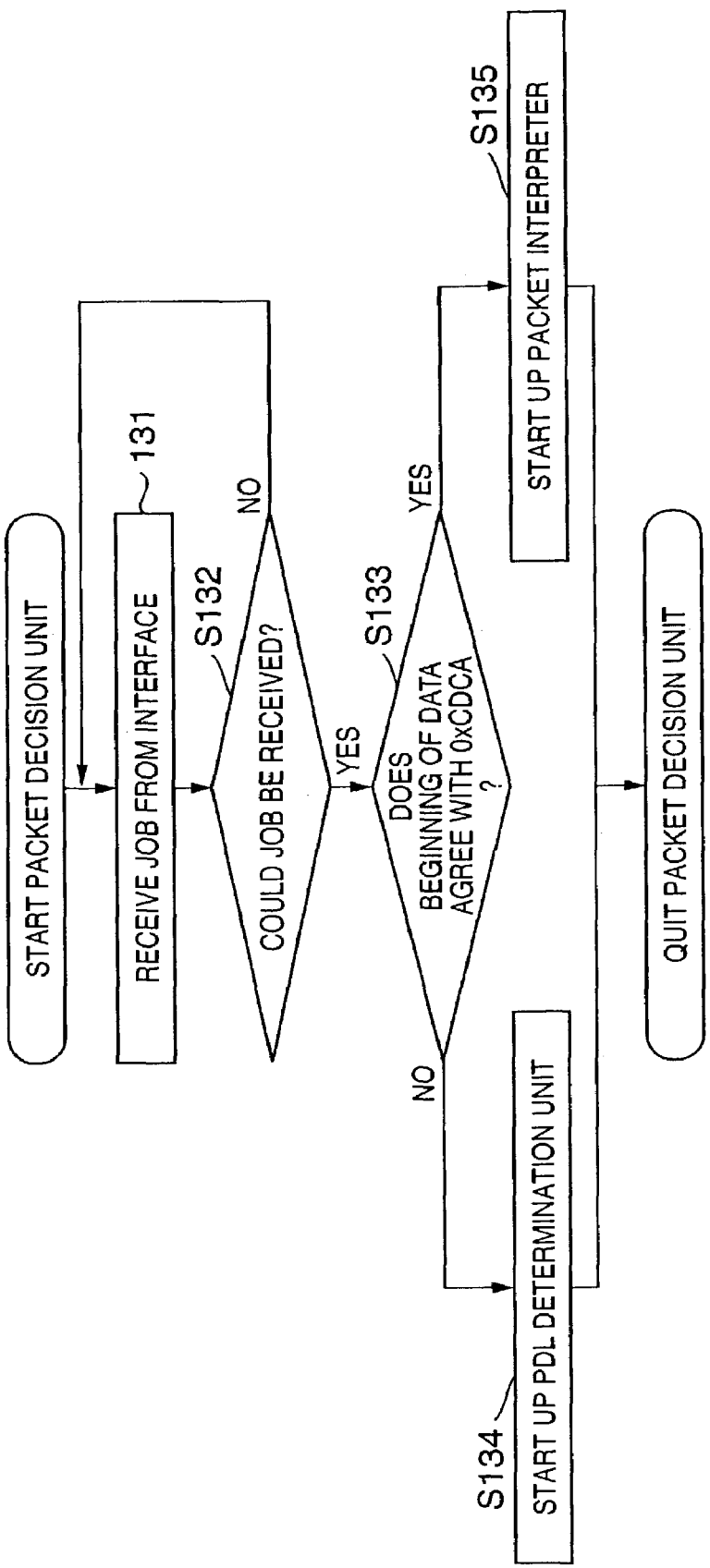
FIG. 13 is a flowchart useful in describing operation of a PDL decision unit.

FIG. 13 is a flowchart for describing the operation of the packet decision unit 322. The packet decision unit 322, which is started up whenever a print job is received, is used to determine whether a print job is of the packet type or conventional type (PDL that has not been packetized).

When processing starts, the packet decision unit 322 receives a print job from the interface 321 at step 131 and determines whether the print job could be received at step 132. If the print job could be received, control branches to step 133; otherwise, control returns to step 131.

If the print job could be received, the packet decision unit 322 determines whether the beginning of the data agrees with the identification character string (0xCDCA) at step 133. If the two agree, the packet decision unit 322 calls the packet interpreter 323 at step 135; otherwise, the packet decision unit 322 calls the PDL determination unit 326 at step 134.

The packet decision unit 322 terminates processing upon calling either the packet interpreter 323 at step 135 or the PDL determination unit 326 at step 134. It should be noted that although the 2-byte identification characters (0xCDCA) at the beginning of the print job are used as the condition for discriminating the type of print job, a longer identification character string may be used in such a manner that the data will not be recognized erroneously as being a conventional PDL section.

<Processing of Packetized PDL Data>

Figure 14:
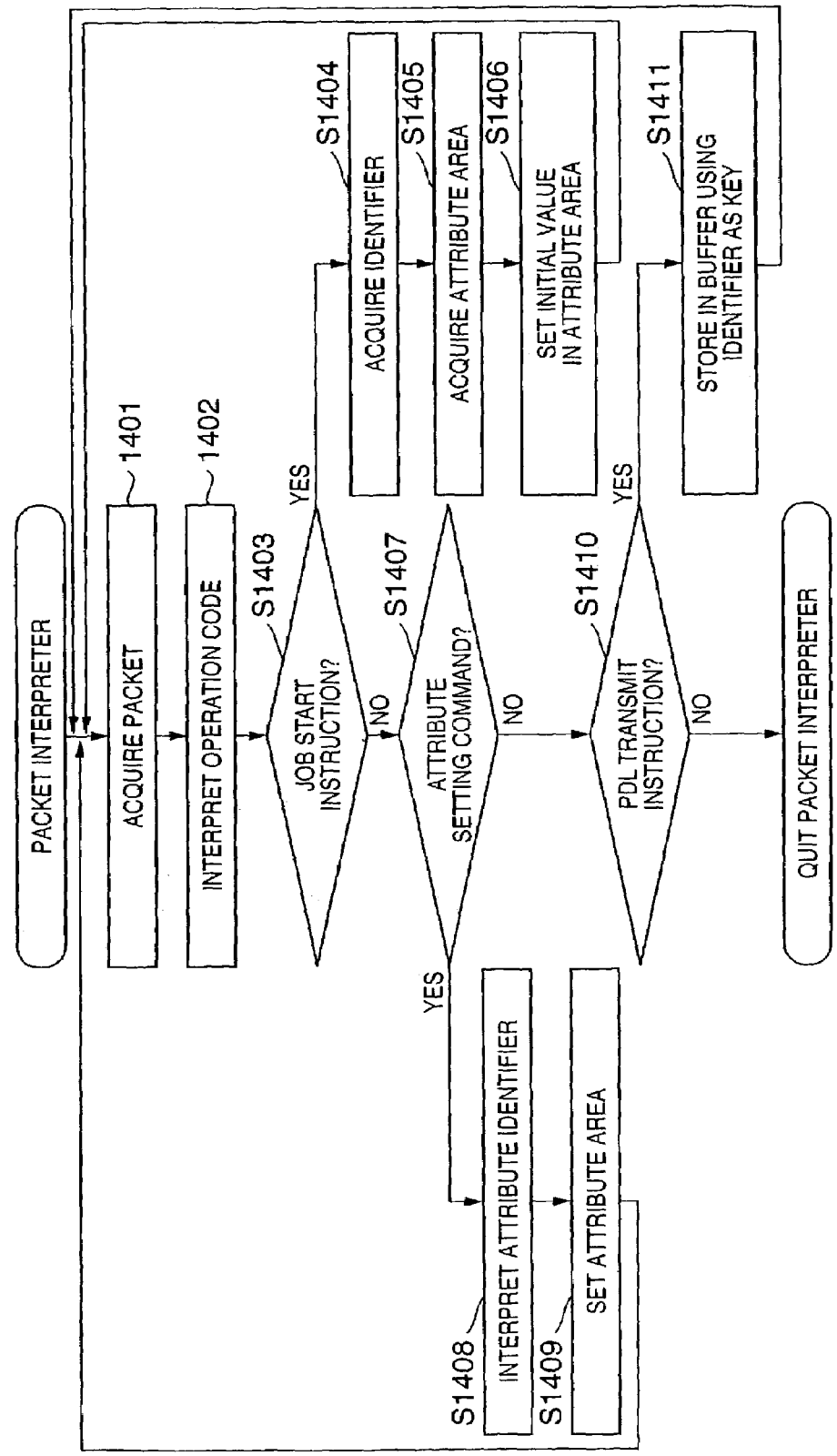
FIG. 14 is a flowchart useful in describing operation of a PDL interpreter.

FIG. 14 is a flowchart useful in describing the operation of the packet interpreter 323 called at step 135 in FIG. 13 in a case where a print job has been recognized as being of the packet type.

When operation of the packet interpreter 323 starts, a packet is received at step 1401 and the packet interpreter 323 interprets the operation code contained in the packet at step 1402. In this embodiment, it is assumed that the operation code matches a job start instruction, attribute setting instruction, PDL transmit instruction or job end instruction. It should be noted that a job attribute includes parameters indicating the printing conditions of the job. A job printing condition is a parameter of processing executed in the printer. This parameter is specified by the application program or operator, etc., that created the print data. Print conditions include various parameters that are necessary when printing is actually performed from PDL at the printer. Examples are designation of a feed tray, designation of a discharge tray, designation of single- or double-sided printing, designation of color or monochrome, designation of number of copies and designation of page layout, etc. Also included are parameters for designating the functions of a so-called finisher, which executes sorting or stapling, in accordance with the functions of the printer.

The packet interpreter 323 determines whether the operation code agrees with a job start instruction at step 1403. If the code agrees, the packet interpreter 323 acquires the job identifier and issues the job identifier with respect to the print job at step 1404, reserves an attribute area, which is for storing a job attribute indicating a printing condition of the job, at step 1405, and sets an initial value in the attribute area at step 1406. The job identifier may be a value read out of a counter incremented by a fixed value whenever read-out is performed, a value obtained by attaching read date and time to the counter value, or a value obtained by attaching a printer-specific identifying name to the counter value. In any case, as long as the value is specific to the printer, it can be utilized as the job identifier.

The packet interpreter 323 determines whether the operation code agrees with an attribute setting instruction at step 1407. If the code agrees, the packet interpreter 323 interprets the attribute identifier, which has been set in the data section 414 of the packet, at step 1408 and sets an attribute value in the attribute area in accordance with the value of the attribute identifier at step 1409. An attribute identifier and an attribute value are related in the same manner as a command character string and parameter shown in FIGS. 8B and 8C, described later. By discriminating the value of the attribute identifier, the length of the attribute value and the area in which it is to be set can be decided. It should be noted that an attribute value that has been set in an attribute area is referred at the time of a PDL data expansion or printing operation executed later. The attribute area is provided in, e.g., the translator 328 or rendering unit 325.

The packet interpreter 323 determines whether the operation code agrees with a PDL transmit instruction at step 1410. If the code agrees, the content of the data section 414, namely the elemental data of PDL, is stored in the receive buffer 324, with the job identifier acquired at step 1404 being used as a key.

Figure 15:
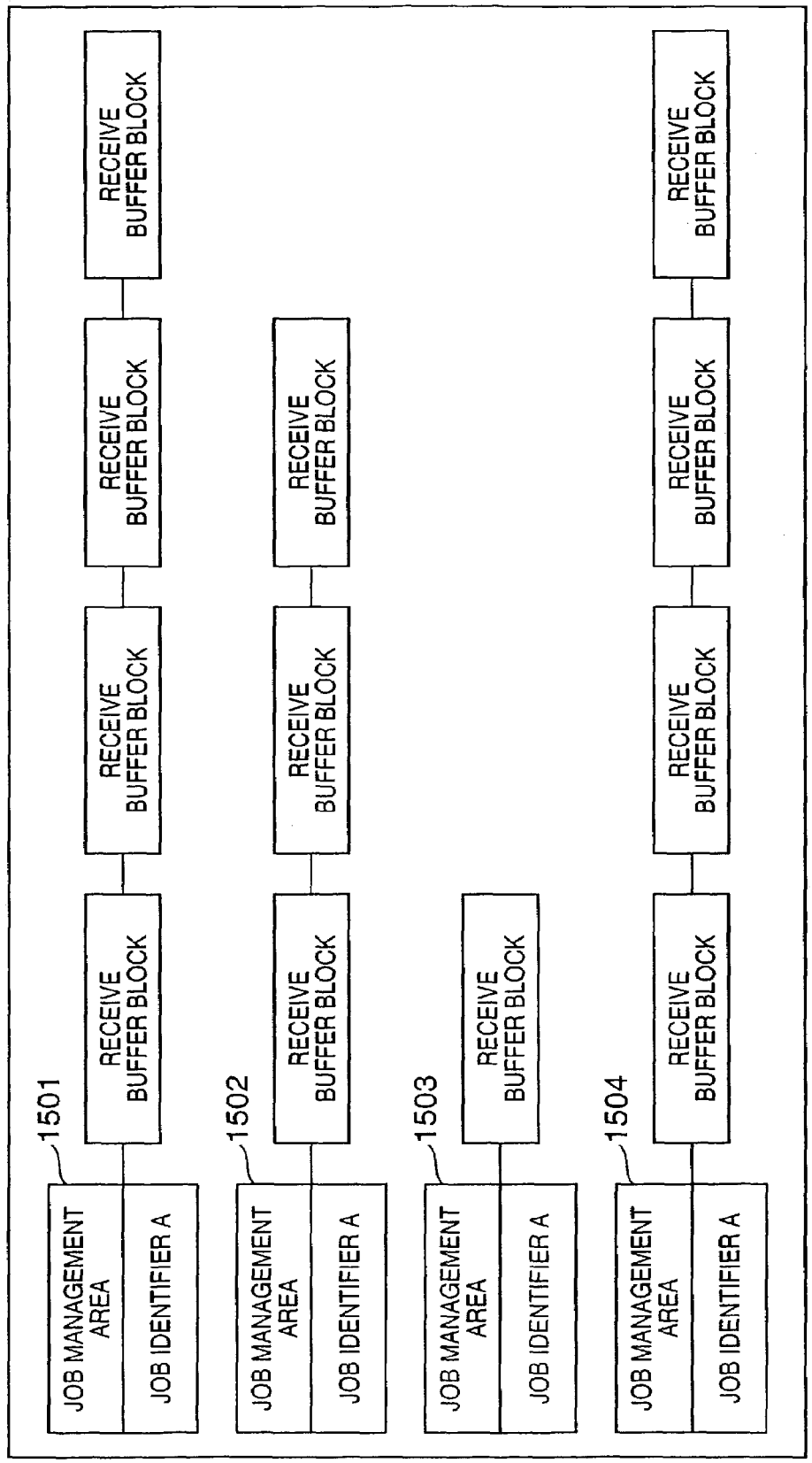
FIG. 15 is a diagram showing an example of PDL data that has been stored in a receive buffer.

FIG. 15 is a schematic view illustrating the structure of the receive buffer 324. According to this embodiment, the receive buffer 324 is not a simple memory but constitutes a single independent object. Consequently, the other processing units, e.g., the packet interpreter 323, PDL end determination unit 327, translator 328 and rendering unit 325, deliver messages such as "WRITE" or "READ" to the receive buffer together with the job identifier, whereby processing conforming to the message is executed.

The receive buffer 324 manages received data on a per-job-identifier basis and is handled just as if a plurality of receive buffers were included for every job identifier. FIG. 15 illustrates, as one example, the state in which three print jobs having job identifiers A, B and C have been stored. A job management area 1501 is an area in which the job having the job identifier A is managed. The job identifier A and the link to the essential data of the job having the job identifier A has been stored in the job management area 1501. Receive buffer blocks that store the print data contained in this print job are chained ahead of the link. The receive buffer blocks may be of fixed or variable size and each has a link field. If an end code has been stored in the link field, then print data extends up to this code. If a pointer has been stored in the link field, then this receive buffer block is linked to a further block and a continuation of the print data is stored in this further block. Thus, receive buffer blocks that store print data contained in one print job are linked by a link chain starting from the job management area.

Further, the job management areas themselves may be arrayed in line in a predetermined area or may be managed upon being linked. In the latter case, job management areas added on can be placed dynamically if only the beginning position (which may be a mere link) is decided in advance. This means that there is no limit upon the number of job management areas.

By virtue of this arrangement, the receive buffer 324 compares a given job identifier successively with job identifiers that have been stored in the job management areas within the receive buffer 324 and, by determining that there is a match, is capable of recognizing print data (PDL data) corresponding to the job identifier.

A job management area 1504 is provided also for a vacant area, and vacant receive buffer blocks that are utilizable are linked. If a new receive buffer block becomes necessary, the required receive buffer block is acquired from among the vacant receive buffer blocks and this block is utilized.

By way of example, if a new print job is to be stored in the receive buffer 324, the packet interpreter 323 delivers the newly acquired job identifier and PDL data along with a message, which requests writing of the PDL data, to the receive buffer 324. The latter searches the job management areas and determines whether the delivered job identifier exists or not. If the result of the search is that the applied job identifier does not exist, the receive buffer 324 reserves a job management area anew and writes the job identifier to this area. One receive buffer block is acquired from the job management area 1504 that manages the vacant areas of the receive buffer 324, a link is established to the final receive buffer block linked to the job management area and the data is written to this newly linked receive buffer block. This operation is repeated until all delivered data is stored in the receive buffer 324.

Further, if a desired print job is to be read out of the receive buffer 324, a unit for performing read-out delivers the job identifier of the print job to be read out along with the address storing the read-out data and a message requesting read out of the data to the receive buffer 324. The latter searches the job management areas and determines whether the delivered job identifier exists or not. If the result of the search is that the applied job identifier exists, the receive buffer 324 reads the data successively out of the receive buffer blocks linked to the job management area that contains this job identifier and stores it starting from a designated address.

Thus, the receive buffer 324 is capable of supporting read and write operations regarding a plurality of print jobs using the job identifiers as a key.

In this embodiment, the receive buffer is constructed as an object. However, the above arrangement can also be implemented even if the receive buffer is made a simple memory and another unit executes the above-described operations of the receive buffer.

<Processing of PDL Data that has not been Packetized>

In a case where print data not been recognized to be of the packet type by the packet decision unit 322, the print data is transferred to the PDL determination unit 326. There are methods of two types through which the PDL determination unit 326 makes a PDL determination. One method is to make the determination upon interpreting job control language (JL), and the other method is to search for the beginning of the print data and analogize data that appears most like PDL.

Job control language has been defined in order to extend PDL and usually is attached to the beginning of PDL data. FIG. 5 illustrates an example of job control language. Here the line written "<ESC> %-12345X" is composed of characters, referred to as UEL (Universal Exit Language), that forcibly bring a job to an end.

The line that begins "@PJL" indicates a description of the job control language. "ENTER LANGUAGE" is a command in job control language and indicates that the data that follows is PDL having the name "LIPS". The PDL data (actual data) is transmitted from this point onward, and the job is completed by the next arrival of UEL. In the case of this data, the PDL name of this data is capable of being discriminated based upon the character string that follows "ENTER LANGUAGE".

In the case of print data that does not contain job control language, the above criteria cannot be used. In such case, PDL is determined by subjecting the data at the beginning of the job to certain analogical decision processing on a per-PDL basis. This processing is a method in which when a match is obtained by specific pattern matching on a per-PDL basis, the data for which the match was obtained is judged to be the PDL data.

<Processing by PDL End Determination Unit (FIG. 6)>

If a PDL name is determined by either of the two methods mentioned above, the print data is further transferred to the PDL end determination unit 327. At this time the PDL determination unit 326 calls the PDL end determination unit 327 using the PDL name as a key.

Figure 6:
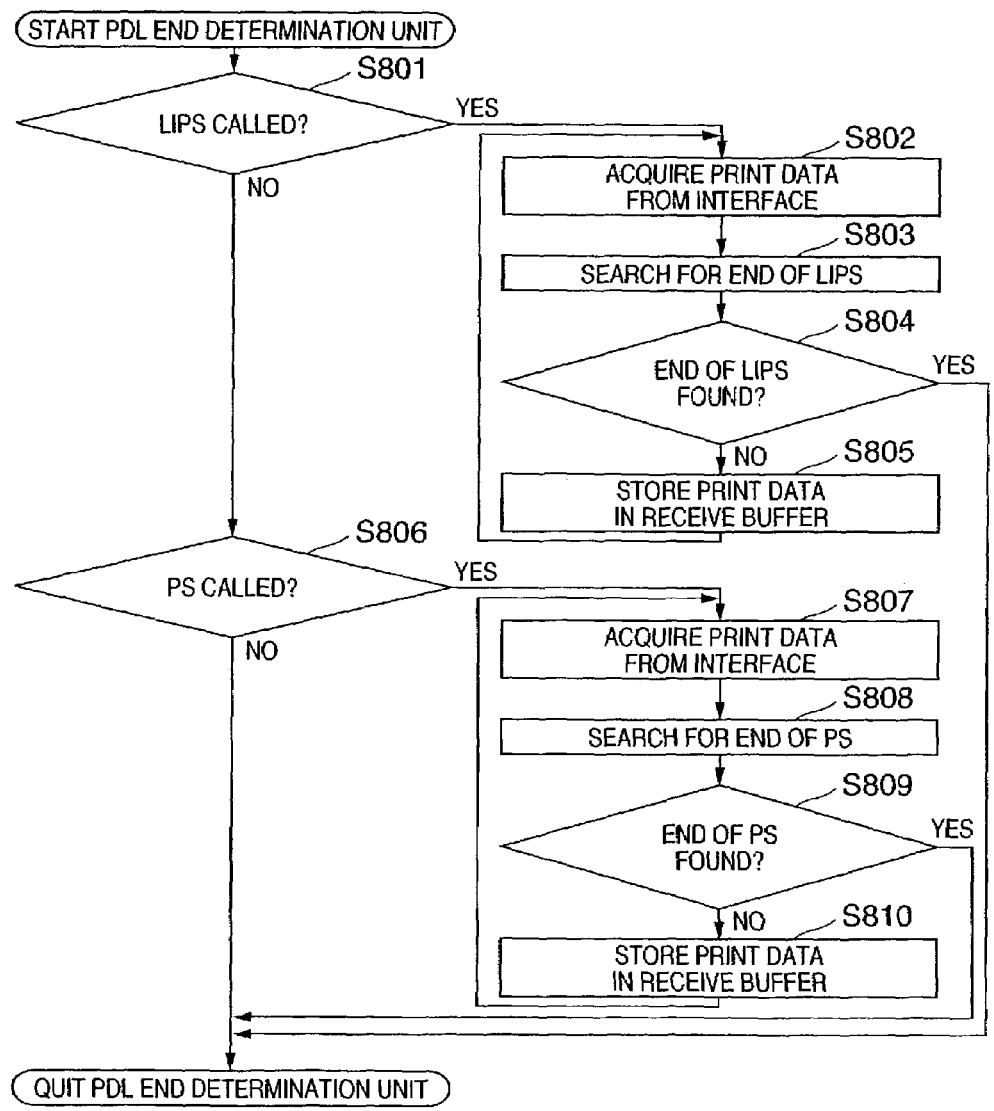
FIG. 6 is a flowchart useful in describing operation of a PDL end determination unit.

FIG. 6 is a flowchart useful in describing the operation of the PDL end determination unit 327. When print data is received, the PDL end determination unit 327 is called after the PDL name is determined by the PDL determination unit 326 at such time that the packet decision unit 322 decides that the print data has not been packetized. At this time PDL name is applied as a key. In this embodiment, the language referred to as LIPS and the language referred to as PostScript (PS) will be described as examples of PDL. It should be noted that by virtue of this processing, a search for the end of the PDL can be performed more efficiently and more rapidly in comparison with interpretation of PDL data for generating rendering data.

At step 801 in FIG. 6, the PDL end determination unit 327 judges whether the key, namely the PDL name, is the name LIPS. If the PDL name is found to be LIPS, then control proceeds to end determination processing for LIPS and the PDL end determination unit 327 acquires print data from the interface at step 802 and searches for the end of LIPS at step 803.

If end of PDL is found at step 804, processing is completed. Following completion of processing, a job identifier is issued with regard to the print job. Print data is stored in the receive buffer 324. If end of PDL is not found, the PDL end determination unit 327 writes the print data to the receive buffer 324 at step 805. Writing is performed by a method similar to that described above with reference to FIG. 15. Thus, the PDL end determination unit 327 terminates processing along with the determination of the end of the print job. When the end of the print data has been recognized, the job identifier, namely the object ID, is attached to the print job that was undergoing end determination processing (namely the print job that includes the end portion). At the moment the object ID has been attached thereto, the print job can undergo a job manipulation of the kind mentioned earlier, namely deletion, cancellation or a change in order of priority.

If the PDL name is not LIPS, the PDL end determination unit 327 determines whether the PDL name is PS at step 806. If the PDL name is PS, then control proceeds to end determination processing for PS and the PDL end determination unit 327 acquires print data from the interface at step 807 and searches for the end of PS at step 808.

If end of PDL is found at step 809, processing is completed. If end of PDL is not found, the PDL end determination unit 327 writes the print data to the receive buffer 324 at step 810. Processing at this time is similar to the processing at step S805.

Figure 10:
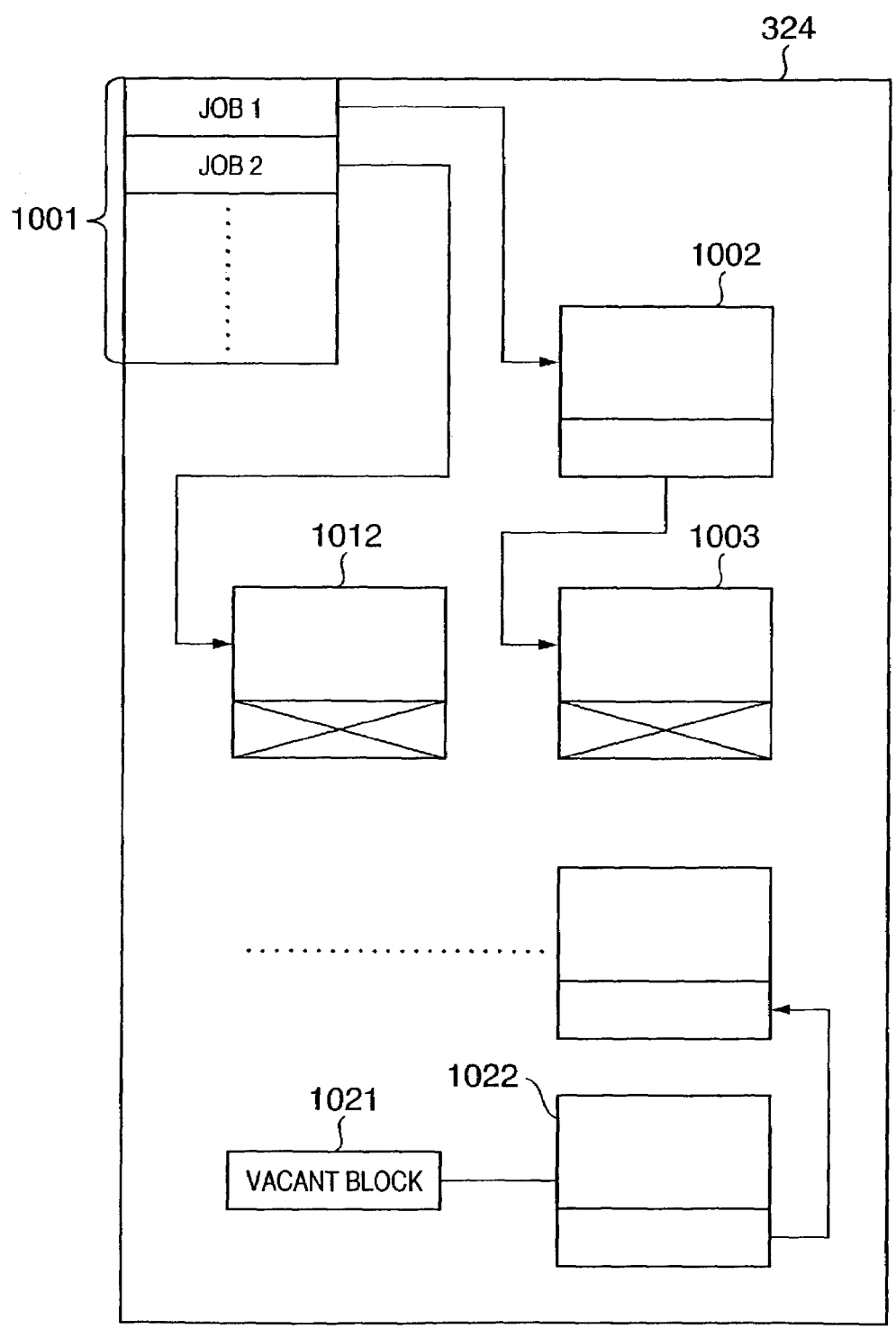
FIG. 10 is a diagram showing an example of PDL data that has been stored in a receive buffer.

FIG. 10 is a diagram illustrating an example of the receive buffer 324 in which two print jobs JOB 1 and JOB 2 have been stored. The receive buffer 324 includes a job management area 1001 for managing the print jobs based upon the identifiers thereof, and a data section for storing the print data per se. The data section is divided into receive buffer blocks of a prescribed size, and already used buffer blocks and buffer blocks currently in use are managed by pointers.

A job identifier appended to print data processing first upon calling of the PDL end determination unit 327 is recorded in the job management area 1001 for managing print jobs. Further, a point is provided in correspondence with the job identifier and is linked to the receive buffer block in which has been stored the print data at the beginning of the print job corresponding to this job identifier. Each receive buffer block also is provided with a pointer. When print data spanning a plurality of receive buffer blocks is stored, the receive buffer blocks are linked by the pointers. The final receive buffer block is capable of being identified by the code that has been written in the pointer thereof. Further, a vacant block that has become unnecessary owing to read-out of print data or discarding of print data therefrom is linked by a job management area (pointer) 1021 for managing the vacant block, and this block is managed as a vacant block.

It should be noted that since the entirety of a print job is ascertained without following the chain of pointers, a pointer to the buffer block at the tail end may be provided in the management unit.

In the example of FIG. 10, receive buffer blocks 1002 and 1003 are linked in chain fashion to print job "JOB 1", and receive buffer block 1012 is linked to "JOB 2". The elementals of the print data have been stored in the linked receive buffer blocks and are managed by the job management area 1001. In FIG. 10, each of the receive buffer blocks is illustrated schematically. In an actual memory, however, the memory is used more efficiently by reserving the receive buffer blocks in contiguous memory areas.

Further, the receive buffer shown in FIG. 10 can be realized more simply if use is made of a file memory such as a hard disk. The reason for this is that if a sector is regarded as a block, as in the manner of a FAT in MS-DOS, for example, then the management method of FIG. 10 will essentially be same as a file management technique, though there will be a difference in that the means for managing the placement of the blocks will rely upon a bitmap rather than the pointers of this embodiment.

Furthermore, after reading a PDL command out of this receive buffer 324 and converting it to intermediate data, the translator 328 stores the intermediate data in an intermediate buffer managed in accordance with a format similar to that of the receive buffer of FIG. 10. A print job is managed by the initially attached job identifier in the intermediate buffer as well. As a result, a print job that has been converted to intermediate data also can be managed by a job identifier.

It should be noted that although the sensing of end of PDL is performed based upon two types of PDL in the flowchart of FIG. 6, it is possible to adopt an arrangement in which end of PDL is sensed by a similar method with regard to more than two types of PDL.

<Print-Job End Sensing Processing (FIGS. 7A to 9)>

Next, a method of actually sensing end on a per-PDL basis will be described. Here it will be assumed that an end character string of PDL to be handled is composed of an ASCII character string referred to as "EOJ", as shown in FIG. 7A. A problem arises as to whether the PDL end determination unit should simply forward search this character string. FIG. 7B is a diagram showing an example of a character-string print instruction. If it is assumed that this character-string print instruction includes first a command character of an character print instruction, then parameter length of the character string and then a character string actually printed, a case in which the characters "EOJ" themselves are contained in the character string actually printed is possible. As a consequence, if a simple forward search is executed, there is a possibility that the end character string will agree with characters contained in this character string and that job end will be sensed erroneously. Accordingly, not only is a simple forward search conducted but sensing of job end must also be performed while PDL syntax is interpreted.

FIGS. 8A-8C illustrate PDL commands and types. Regardless of the type, a command character string is included at the beginning and the type of the command can be discriminated based upon the character string. Commands are of three types. The types are (1) simple format, in which the command character string itself completes the command (FIG. 8A); (2) fixed-length format, which is composed of a command character string and a fixed-length parameter that completes the command (FIG. 8B); and (3) a variable-length format, which is composed of a command character string, then a succeeding parameter length indicating the size of the parameter, then the actual parameter (FIG. 8C). FIGS. 8A-8C illustrate these three types of commands. For example, the end command "EOJ" is a command composed solely of the command character string and corresponds to type (1) shown in FIG. 8A. It should be noted that the length of a "command character string" and the length of "parameter length" are assumed to be fixed lengths.

In order to make it possible to search for solely the command character string in the sensing of end of job, the end character string is searched for while performing syntactical interpretation. For example, in the case of the fixed-length parameter shown in FIG. 8B, the parameter portion is jumped so as to exclude the parameter portion from the search. In the case of the variable-length parameter shown in FIG. 8C, the parameter portion is jumped so as to exclude the parameter length and parameter portion from the search. By thus searching for the end character string, the end of the print job can be sensed in reliable fashion.

In other words, the PDL end determination unit 327 analyzes the actual data that follows the "ENTER LANGUAGE" command of the job control language shown in FIG. 5. Since what immediately follows the "ENTER LANGUAGE=" command is the PDL command, analysis starts sequentially starting from this point.

(a) First, a command is fetched from the interface and whether this is the end character string "EOJ" is determined by referring to a PDL dictionary to which this command belongs.

(b) If the command is determined to be the end character string, then the data up to the immediately preceding block is actual data constituting the print job. Accordingly, the end of the print job is determined. This end character string is stored in the receive buffer 324 and processing is terminated.

(c) If the command is determined not to be the end character string, then the command is determined to be one of the types (1), (2), (3) shown in FIGS. 8A, 8B, 8C, respectively.

(d) If the command is type (1), the command is stored in the receive buffer and processing is repeated from (a) with regard to the immediately following command.

(e) If the command is type (2), the immediately following parameter length will have been decided in accordance with the command and therefore the command and the parameter are stored in the receive buffer and processing is repeated from (a) with regard to the immediately following parameter.

(f) If the command is type (3), the command inclusive of the parameter of length specified by the immediately following parameter length is stored in the receive buffer and processing is repeated from (a) with regard to the command that immediately follows this parameter.

The steps (a) to (f) above are executed at steps 802 to 805 and steps 807 to 810 in FIG. 6.

It should be noted that if print data to be stored, i.e., commands and parameter, etc., is data at the beginning of a print job, then a job management area is reserved anew for one job, the job identifier is recorded in this area and the newly reserved receive buffer block is linked, just as described above. The data is stored in this buffer block.

In a case where data to be stored exceeds the end of the receive buffer block, a new vacant receive buffer block is reserved, a link is establishing to this receive buffer block and the print data is stored in this block, as described above.

Figure 9:
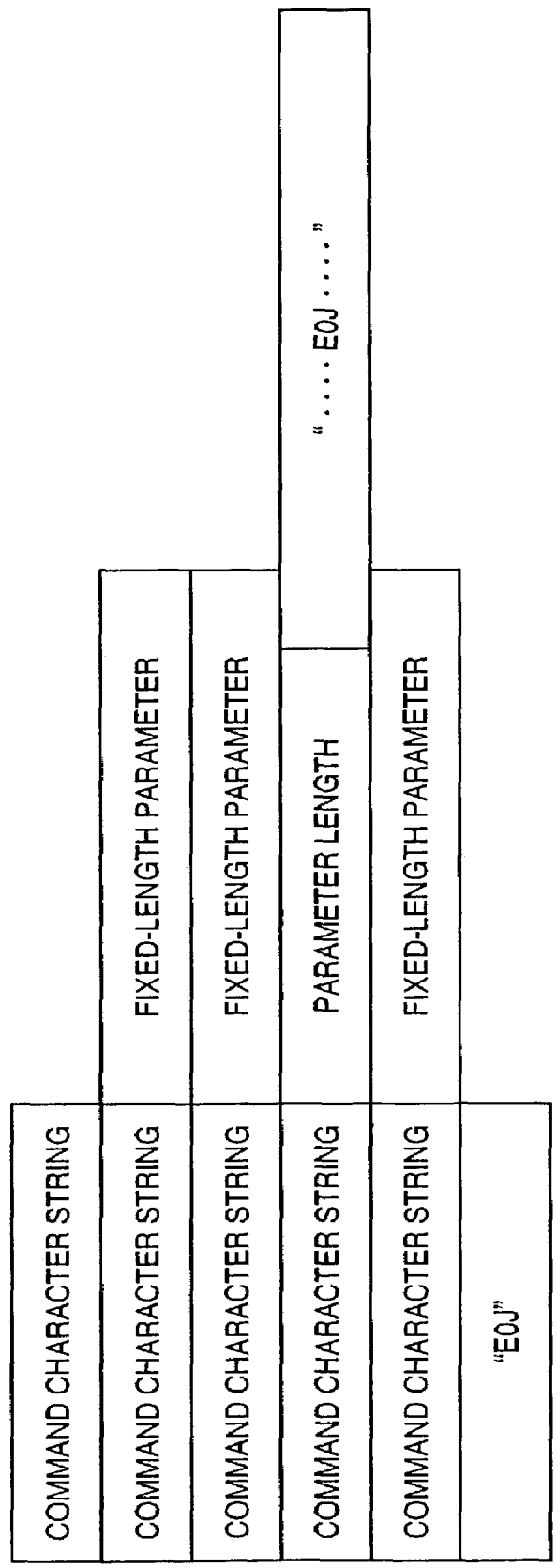
FIG. 9 is a diagram illustrating an example of PDL data obtained by combining PDL commands.

FIG. 9 illustrates an example of print data. If a search of end character strings by syntactical interpretation is conducted, the parameter section sections in FIG. 9 are excluded from the search and, hence, even if the "EOJ" character string has been attached to part of a parameter, this will not be recognized erroneously as job end.

Thus, a print job is stored in the receive buffer 324 after an identifier is appended thereto in the printing apparatus. Now assume by way of example that a command requesting the job identifier of a print job has been transmitted from the host computer. The printing apparatus responds by sending the job identifier of the print job recorded in the job management area 1001 back to the host computer. For example, by previously recording a host identifier for identifying the host computer that is the transmission source of the print job in the job management area 1001, it is possible for the printing apparatus to respond with a job identifier solely with regard to the print job issued by the host computer that is the source of the request. Thus, the host computer is capable of acquiring the processing waiting state of the printing apparatus or the job identifier of the print job currently being processed. In a further example, by additionally recording the identifier attached to a print job by the host computer that is the transmission source of the print job in the job management area 1001, the printing apparatus can correlate the identifier attached by the host computer that is the source of the request and the identifier attached by the printing apparatus and can use these correlated identifiers to respond to the host computer that is the source of the request. However, there is the possibility that the identifier attached by the host computer will not be unique within the printing apparatus.

The host computer that has thus acquired the job identifier of a print job specifies the print job by this job identifier and can send the printing apparatus commands such as delete command to delete a print job, a suspend command to suspend a print job temporarily, and a resume command to resume execution of a suspended print job. The printing apparatus that has received a command of such job manipulation identifies the command. When this is achieved, the printing apparatus specifies the print job by searching the job management areas of the receive buffer 324 and intermediate buffer 329 based upon the designated job identifier input to the printing apparatus together with the command, and executes the print job for which the designated operation, e.g., deletion or suspension, has been specified.

Thus, in accordance with the first embodiment of the present invention, the starting and end points of a print job can be recognized at an early stage of processing executed by a printing apparatus, i.e., at the stage of storage in a receive buffer, by PDL determination and PDL end determination processing of unpacketized PDL data ahead of the receive buffer, and a job identifier can be assigned to each individual print job. As a result, it is possible to perform operations such as cancellation, interruption, stopping and resumption of a print job stored in the receive buffer of a printing apparatus.

Furthermore, by adopting the channel for a command regarding such a print job as a channel different from that of the print job, an instruction for manipulating a print job can be issued from a host computer to a printing apparatus even in a case where print data is being transmitted from this host computer. In other words, a print job and manipulation of the print job can be carried out asynchronously. As a result, manipulation of the print job can be executed immediately following the instruction for this manipulation.

Second Embodiment

PDL end recognition processing in the first embodiment is complicated processing accompanied by syntactical interpretation. Depending upon the PDL, the syntax itself is put into the form of program language, and conditional branching and PDL inclusion (INCLUDE) processing are allowed. If end recognition processing is executed with regard to such PDL, there are cases where this processing becomes much more complicated. On the other hand, since PDL end recognition processing is placed ahead of the receive buffer, a great amount of processing will influence receiving performance and, hence, will invite a decline in the overall performance of the printing apparatus. PDL end recognition processing that is simple is preferred in terms of the overall system. Accordingly, in this embodiment, by simplifying PDL end recognition processing in the manner set forth below, a decline in the overall performance of the system is prevented.

Depending upon the PDL, there are cases where a specific character code is used as PDL end. For example, in the case of PostScript, Control-D (0x04) is handled as an end code when the mode is the ASCII mode. Since Control-D does not enter as another command character string or as a parameter, it will suffice to merely forward search this character code without executing syntactical interpretation. Such an end code that does not require syntactical interpretation shall be referred to as an explicit end code. By thus conducting a simple search of a single character, effects similar to those of the first embodiment can be obtained with greater simplicity and higher speed.

Similarly, Control-A M (0x01 0x4d) is adopted as an explicit end code in the TBCP mode of PostScript. By conducting a simple search of two characters in this case, effects similar to those of the first embodiment can be obtained.

If this procedure is applied to the procedure of FIG. 6 in the first embodiment, operation is as follows: At step 808 in FIG. 6, parsing processing is not executed. Rather, a search is simply conducted for the explicit end code decided by this PDL, i.e., "Control-D" code in the ASCII mode or "Control-A"+"M" code in the TBCP mode. If the explicit end code is found as a result, this becomes the delimiting boundary of the print job and control branches to "YES" at step 809.

This embodiment is not limited to PostScript, as a matter of course. As long as the explicit end code is PDL that has been defined, the delimiting boundary of the print job can be found with ease by forward searching the explicit code in a manner similar to that of this embodiment regardless of the PDL. Accordingly, an identifier can be appended to each print job in the printing apparatus and data on a per-print-job basis can be managed in correlation with the identifier. In addition, no decline in processing efficiency is brought about by the processing for achieving this.

Third Embodiment

Depending upon the PDL, there are instances where the syntactical interpretation is complicated and, moreover, an explicit end code of the kind described in the second embodiment does not exist. In such case, the beginning and end of a session in the lower layer of the protocol being utilized as the base for data transfer, namely the protocol stack adopted in order to implement data transfer, may be used as the beginning and end of the job. In this case, it is necessary that the beginning and end of a session and the beginning and end of a print job, respectively, be correlated.

A layer corresponding to the transport layer (the layer of transparent data transfer between terminals) of, e.g., an OSI (Open Systems Interconnection) can be used as the lower layer. In this case, the method of this embodiment cannot be adopted with regard to a local interface such as an IEEE 1284 or USB in which there is no concept of a session in the layer corresponding to the transport layer. Conversely, in a case where a host computer and printing apparatus have been connected using a protocol in which the concept of a session exists, as in the manner of TCP (Transmission Control Protocol) of a TCP/IP protocol stack, the beginning and end of the session in the TCP layer are correlated with the beginning and end of a print job to thereby discriminate the delimiting boundary of the session, as a result of which the delimiter of the print job can be determined and an identifier can be attached to each print job.

Alternatively, in a case where data transfer from a host computer does not take place in a fixed period of time, this is regarded as system time-out and is construed as being the position at which the job is completed.

FIG. 11 is a flowchart obtained by modifying the procedure of FIG. 6 to that of this embodiment.

If LIPS has been called at step 1301 in FIG. 11, an attempt is made to acquire print data from the interface at step 1302. However, in a case where end of a session is sensed, i.e., if EOF (End of File) is received, control branches at step 1303 and completion of the job is decided. Alternatively, if receipt of print data over a fixed period of time cannot be achieved, control branches at step 1304 and completion of the job is decided. If end of the print job cannot be decided at steps 1303 and 1304, then, at step 1305, an end command is detected by parsing, as in the first embodiment, or, in case of PDL having an explicit end code, the end code is forward searched, as in the second embodiment, whereby the delimiter of the print job can be discriminated. By discriminating the delimiter, individual print jobs can be determined and identifiers appended thereto, and it is possible to manage print jobs by their identifiers. If end of job is not found, the acquired data is stored in the receive buffer 324.

Processing is similar also in a case where the PDL is determined to be PS at step 1301.

Thus, by making joint use of session beginning and end and time-out, it is possible to sense end of job even in the case of a PDL format for which syntactical interpretation is difficult. Further, even in a case where end of a print job cannot be discriminated by session beginning and end and time-out, print jobs can be managed job by job by detecting an end instruction contained in the PDL.

In this embodiment, end of a session is discriminated. If end of a print job cannot be discriminated by determining session end, then time-out is discriminated. If end of a print job still cannot be discriminated, then end of print job is discriminated through the procedure of the first or second embodiment. However, before discrimination is performed by the procedure of the first or second embodiment, it is permissible to execute only the discrimination based upon end of session or to execute the end of job discrimination based solely upon time-out.

In accordance with the present invention as set forth in the first embodiment, as described above, received print data can be delimited into individual print jobs and managed job by job ahead of the receive buffer not only in the case of packet-type print data but also in the case of conventional PDL data.

Thus, in accordance with the present invention, as described above, received print data can be delimited into individual print jobs ahead of the receive buffer and therefore print jobs can be managed from an earlier stage. Further, a job identifier can be issued for a print job, to which a header has been attached, at an earlier stage, and a job identifier can be issued as early as possible even for a print job to which a header has not been attached.

As many apparently widely different embodiments of the present invention can be made without departing from the spirit and scope thereof, it is to be understood that the invention is not limited to the specific embodiments thereof except as defined in the appended claims.

What is claimed is:

1. A printing control apparatus capable of processing a first print job corresponding to print data to which a header has been attached and a second print job corresponding to print data to which a header has not been attached, comprising:

a receiving unit for receiving the print data;

a receive buffer for storing the received print data;

an interpreting unit for interpreting the print data stored in said receive buffer;

a first print-job detecting unit for issuing an identifier, which is for identifying the first print job, in accordance with a header which indicates the beginning of the first print job and a header which indicates the end of the first job; and a second print-job detecting unit for searching for an end of the print data corresponding to the second print job based on the received print data before the received print data is stored in said receive buffer and for issuing an identifier, which is for identifying the second print job recognized in accordance with the end point of the print data.

2. The apparatus according to claim 1, wherein if received print data has been described in page description language, said second print-job detecting unit searches for an end instruction, which is contained in the print data corresponding to the second print job, while jumping over arguments and decides that the position of the end instruction found by the search is the end of the print data.

3. The apparatus according to claim 1, wherein if received print data has been described in page description language, said second print-job detecting unit searches for end instruction, which is contained in the print data corresponding to the second print job, and decides that the position of the end instruction found by the search is the end of the print data.

4. The apparatus according to claim 1, wherein said second print-job detecting unit stores print data corresponding to the second print job in said receive buffer while searching for an end point of the print data.

5. The apparatus according to claim 4, wherein said first print-job detecting unit stores print data corresponding to the first print job in said receive buffer in accordance with the header indicative of the print data.

6. A computer-readable storage medium storing a computer program code for processing a first print job corresponding to print data to which a header has been attached and a second print job corresponding to print data to which a header has not been attached, said computer program code causing a computer to performing the steps of:

receiving the print data;

storing the print data in a receive buffer;

interpreting the print data stored in the receive buffer;

issuing an identifier, which is for identifying the first print job in accordance with a header, which indicates the beginning of the first print job and a header which indicates the end of the first job;

searching for an end of the print data corresponding to the second print job based on the received print data before the received print data is stored in said receive buffer; and issuing an identifier, which is for identifying the second print job recognized in accordance with the end point of the print data.

7. A printing control method for processing a first print job corresponding to print data to which a header has been attached and a second print job corresponding to print data to which a header has not been attached, comprising:

a receiving step of receiving the print data;

a storing step of storing the received print data in a receive buffer;

an interpreting step of interpreting the print data stored in the receive buffer;

a first issuing step of issuing an identifier, which is for identifying the first print job, in accordance with a header which indicates the beginning of the first print job and a header which indicates the end of the first job;

a searching step of searching for an end of the print data corresponding to the second print job based on the received print data before the received print data is stored in the receive buffer; and a second issuing step of issuing an identifier, which is for identifying the second print job recognized in accordance with the end point of the print data.

* * * * *